US007773133B2

(12) United States Patent
Jeong et al.

(10) Patent No.: US 7,773,133 B2
(45) Date of Patent: Aug. 10, 2010

(54) CAMERA APPARATUS AND METHOD FOR REMOVING IMAGE NOISE

(75) Inventors: Young-Min Jeong, Suwon-si (KR); Sang-Wook Oh, Ansan-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 489 days.

(21) Appl. No.: 11/888,763

(22) Filed: Aug. 2, 2007

(65) Prior Publication Data
US 2008/0030591 A1    Feb. 7, 2008

(30) Foreign Application Priority Data
Aug. 2, 2006    (KR) .................. 10-2006-0072966

(51) Int. Cl.
*H04N 5/217*    (2006.01)
(52) U.S. Cl. .................. 348/241; 348/235; 348/236
(58) Field of Classification Search .................. 348/162, 348/222.1, 216.1, 234–239, 241, 242, 243, 348/289, 290, 370; 382/254–275
See application file for complete search history.

(56) References Cited
U.S. PATENT DOCUMENTS 4,392,157 A * 7/1983 Garcia et al. ................ 348/243

| 7,499,087 B2 * | 3/2009 | Yano et al. ............... 348/241 |
| 7,586,525 B2 * | 9/2009 | Tamaru et al. ............ 348/241 |
| 2003/0043285 A1 * | 3/2003 | Makino .................... 348/235 |
| 2003/0227558 A1 * | 12/2003 | Jaspers .................... 348/241 |
| 2004/0091145 A1 * | 5/2004 | Kohashi et al. ........... 382/162 |
| 2006/0192865 A1 * | 8/2006 | Suzuki .................... 348/241 |

FOREIGN PATENT DOCUMENTS

| KR | 10-0213235 | 5/1999 |
| KR | 2005-77116 | 8/2005 |

* cited by examiner

*Primary Examiner*—Lin Ye
*Assistant Examiner*—Don Nguyen
(74) *Attorney, Agent, or Firm*—Cha & Reiter, LLC

(57) ABSTRACT

Disclosed is a method of removing image noise of a camera having an illumination sensor. The method includes: grasping the noise response characteristics of the camera and storing mean signal-to-noise ratio values for respective illumination values in a low frequency region and a high frequency region; acquiring the present illumination value using the illumination sensor when photographing an image; reading mean signal-to-noise ratio values of the low frequency region and the high frequency region corresponding to the present illumination value from the stored mean signal-to-noise ratio values; and applying the read mean signal-to-noise values to filters for respective frequency regions, thereby filtering the signals of the photographed image.

10 Claims, 3 Drawing Sheets

CAMERA APPARATUS AND METHOD FOR REMOVING IMAGE NOISE

CLAIM OF PRIORITY

This application claims the benefit under 35 U.S.C. §119(a) of an application entitled "Camera Apparatus and Method for Removing Image Noise," filed in the Korean Intellectual Property Office on Aug. 2, 2006 and assigned Serial No. 2006-72966, the contents of which are hereby incorporated by reference.

BACKGROUND OF THE INVENTION

1. Field of the Invention

The present invention relates to a camera, and in particular, to an apparatus and a method of removing image noise in a camera having an illumination sensor.

2. Description of the Related Art

In general, noise generated by a camera sensor, such as a charge coupled device(CCD) sensor, in a camera occurs due to an increase in temperature of the CCD sensor and the artificial amplifications of signals.

It is possible to suppress the image noise by reducing the temperature of a CCD sensor. An expensive digital camera is typically provided with a mechanical cooling means for electronically cooling the CCD sensor in order to reduce the temperature of the CCD sensor. However, an ordinary digital camera is not equipped with such a mechanical cooling system or a CCD sensor cooling device due to costs.

Therefore, in an ordinary digital camera, image noise is removed with the aid of a software instead of a CCD sensor cooling device. A representative method of removing image noise includes capturing an image and then synthesizing the captured image with a file that is fabricated by operating the camera in a state in which the lens is blocked.

The above method is mainly employed as a post-processing algorithm at the final stage as means for providing a high quality image to a user.

In operation, the sensor amplifies signals received by the CCD in order to maintain the brightness of an image to be constant. Because all pixels do not receive the same amount of light, there is a difference in amplification process among the pixels. This is a direct cause of producing glaring noise in a photographed picture or image. It is a noise reduction function that serves to correct the noise produced using the software.

Most of the existing noise reduction algorithms are designed to omnidirectionally perform a smoothing operation within a flat region of an image and to scarcely perform the smoothing at the edge area of an image.

When noise is greatly produced under a low-illumination environment, the noise reduction algorithms can readily remove noise within a flat region of an image. However, the noise at the edge region of the image is not sufficiently removed. As a result, the image acquired using the above method is not satisfactory.

Furthermore, if noise is not removed from a photographed image as stated above, there is a problem in that the compression efficiency for the corresponding image cannot be substantially improved.

SUMMARY OF THE INVENTION

Accordingly, the present invention has been made to solve the above-mentioned problems occurring in the prior art and provides additional advantages, by providing a camera apparatus and a method of adaptively removing image noise produced when photographing an image in an illuminated environment.

Another aspect of the present invention is to provide a camera apparatus and a method of efficiently removing image noise produced when photographing an image.

Yet another aspect of the present invention is to provide a camera apparatus and a method of efficiently removing image noise, thereby increasing the compression efficiency for a photographed image.

In one embodiment, there is provided a method of removing image noise of a camera having an illumination sensor which includes: grasping the noise response characteristics of the camera and storing mean signal-to-noise ratio values for respective illumination values in a low frequency region and a high frequency region; acquiring the present illumination value using the illumination sensor when photographing an image; reading mean signal-to-noise ratio values of the low frequency region and the high frequency region corresponding to the present illumination value from the stored mean signal-to-noise ratio values; and applying the read mean signal-to-noise values to filters for respective frequency regions, thereby filtering the signals of the photographed image.

According to another aspect of the present invention, there is provided a camera apparatus with an illumination sensor which includes: a camera unit for photographing an image and outputting signals of the photographed image; a filter unit for filtering the image signals separately for a low frequency region and a high frequency region; a memory unit for storing mean signal-to-noise ratio values for respective illumination values of the low frequency region and the high frequency region according to the noise response characteristics of the camera unit; and a control unit for reading from the memory unit the signal-to-noise ratio values of the low frequency region and the high frequency region corresponding to an illumination value acquired through the illumination sensor when photographing an image, and for applying the read signal-to-noise values to the filter unit.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Figure 1:
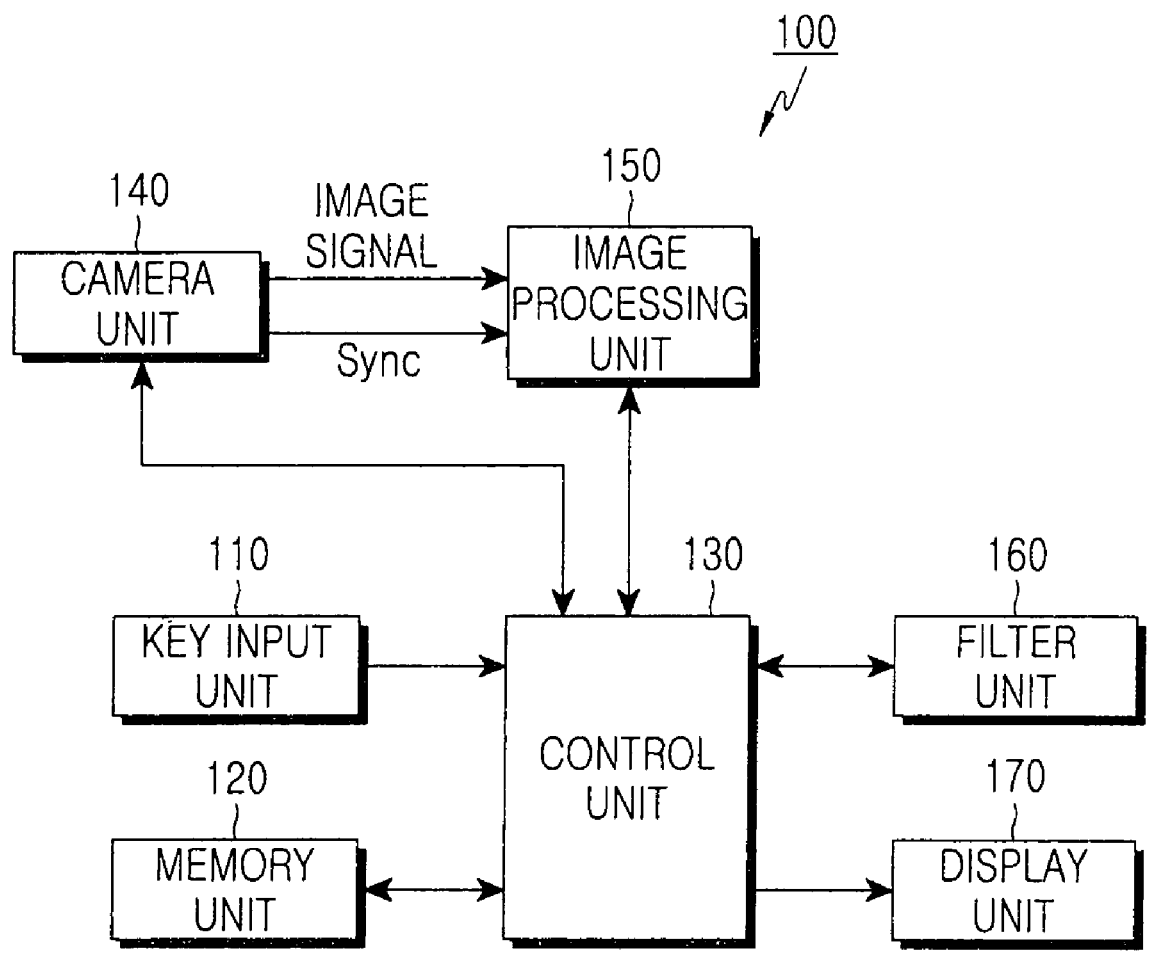
FIG. 1 is a block diagram of a camera apparatus according to an embodiment of the present invention.

Hereinafter, embodiments of the present invention will be described with reference to the accompanying drawings. For the purposes of clarity and simplicity, the same elements will be designated by the same reference numerals although they are shown in different drawings and a detailed description of well known functions and configurations incorporated herein will be omitted when it may obscure the subject matter of the present invention.

FIG. 1 is a block diagram of a camera apparatus according to an embodiment of the present invention.

As shown, the camera apparatus 100 includes a key input unit 110, a memory unit 120, a control unit 130, a camera unit 140, an image processing unit 150, a filter unit 160, and a display unit 170. It is assumed that the camera apparatus according to the present embodiment has an illumination sensor (not shown) of a hardware configuration for sensing the amount of light, from a certain area, received for a predetermined length of time, wherein the unit of the illumination value is lux.

The key input unit 110 includes character keys, numeric keys, various function keys, and an external key, so that a key input signal corresponding to a key inputted by a user is outputted to the control unit 130. In addition, the key input unit 110 includes, at a predetermined area, camera operation keys, e.g. a zoom key for use in adjusting and operating a zooming process (i.e., magnification) of a lens provided in the camera unit 140, and a shutter key for use in photographing an image.

The memory unit 120 may consist of program memories and data memories, and store various information items required for controlling the operation of the camera apparatus 100 according to the present embodiment as well as other various information items selected on the basis of user's selection. That is, the memory unit 120 includes a ROM for storing operation algorithms accessed through the control unit 130 for the entire operation of the camera apparatus 100, and a RAM for storing data according to a control instruction for processing data of the control unit 130.

In addition, the memory unit 120 stores mean signal-to-noise ratio values for respective illumination values of a low frequency region and a high frequency region according to the noise response characteristics of the camera unit under the control of the control unit 130.

The mean signal-to-noise ratio values of the low frequency region are values for removing noise of the low frequency region from the entire frequency region, and the mean signal-to-noise ratio values of the high frequency region are values for removing noise of the high frequency region from the entire frequency region.

The control unit 130 controls the overall operations of the camera apparatus 100 according to the present embodiment. In addition, the control unit 130 adjusts the noise according to the noise response characteristics of the camera 140, thereby acquiring the mean signal-to-noise ratio values for respective illumination values of the low frequency region and the high frequency region, wherein the acquired values are stored in the memory unit 120. For this purpose, the control unit 130 renders the camera unit to photograph a noise evaluation chart (for example, the noise evaluation chart proposed by a camera test standard, ISO 15739) for respective illumination values under a standard light source. Then, the control unit 130 calculates signal-to-noise ratio values, and classifies the calculated signal-to-noise ratio values into those of the low frequency region and the high frequency region, thereby acquiring mean signal-to-noise ratio values for each of the low frequency and high frequency regions.

Moreover, the control unit 130 reads, from the memory unit 120, the mean signal-to-noise ratio values of the low frequency region and the high frequency region corresponding to the illumination values acquired through the illumination sensor when photographing an image, and then applies the mean signal-to-noise ratio values for the respective regions to the filter unit 160, thereby changing a filter coefficient. The photographed image signal is outputted after being filtered through the filter unit 160, thus the filter coefficient of which has been changed.

The camera unit 140 obtains image data and may include an extendible and retractable lens unit (not shown). In addition, the camera unit 140 includes a camera sensor (not shown) for converting an optical signal of a photographed image into an electrical signal, and a signal processing unit (not shown) for converting an analogue signal of an image photographed by the camera sensor into digital data.

Assuming that the camera sensor is a CCD sensor, the signal processing unit can be implemented by a DSP (Digital Signal Processor). In addition, the camera sensor and the signal processing unit may be either integrally or separately implemented.

The image processing unit 150 performs a function of generating picture data for displaying an image signal outputted from the camera unit 140.

The image processing unit 150 processes the image signal outputted from the camera unit 140 in the unit of frame, and outputs the image data in the unit of frame to be suited to the characteristics and size of the display unit 170.

In addition, the image processing unit 150 includes an image codec (not shown), wherein the image processing unit 150 either compresses the frame image data displayed on the display unit 170 in a predetermined type or restores the compressed frame image data to the original frame image data.

Assuming that the image processing unit 150 has an OSD (On Screen Display) function, the image processing unit 150 is capable of outputting OSD data according to the screen size displayed under the control of the control unit 130.

According to the present embodiment, the filter unit 160 includes a low frequency filter for filtering an image signal in the low frequency region, and a high frequency filter for filtering an image signal in the high frequency region. The filter unit 160 removes image noise by separately filtering photographed image signals for each of the low frequency and high frequency regions.

The display unit 170 may be made of an LCD (Liquid Crystal Display) or the like, wherein the display unit 170 outputs various display data generated by the camera apparatus. If the LCD is implemented with a touch screen type function, the display unit 170 may serve as an input unit. The display unit 170 displays the image signals outputted from the image processing unit 150 as a picture and also displays the user data outputted from the control unit 130.

Figure 2:
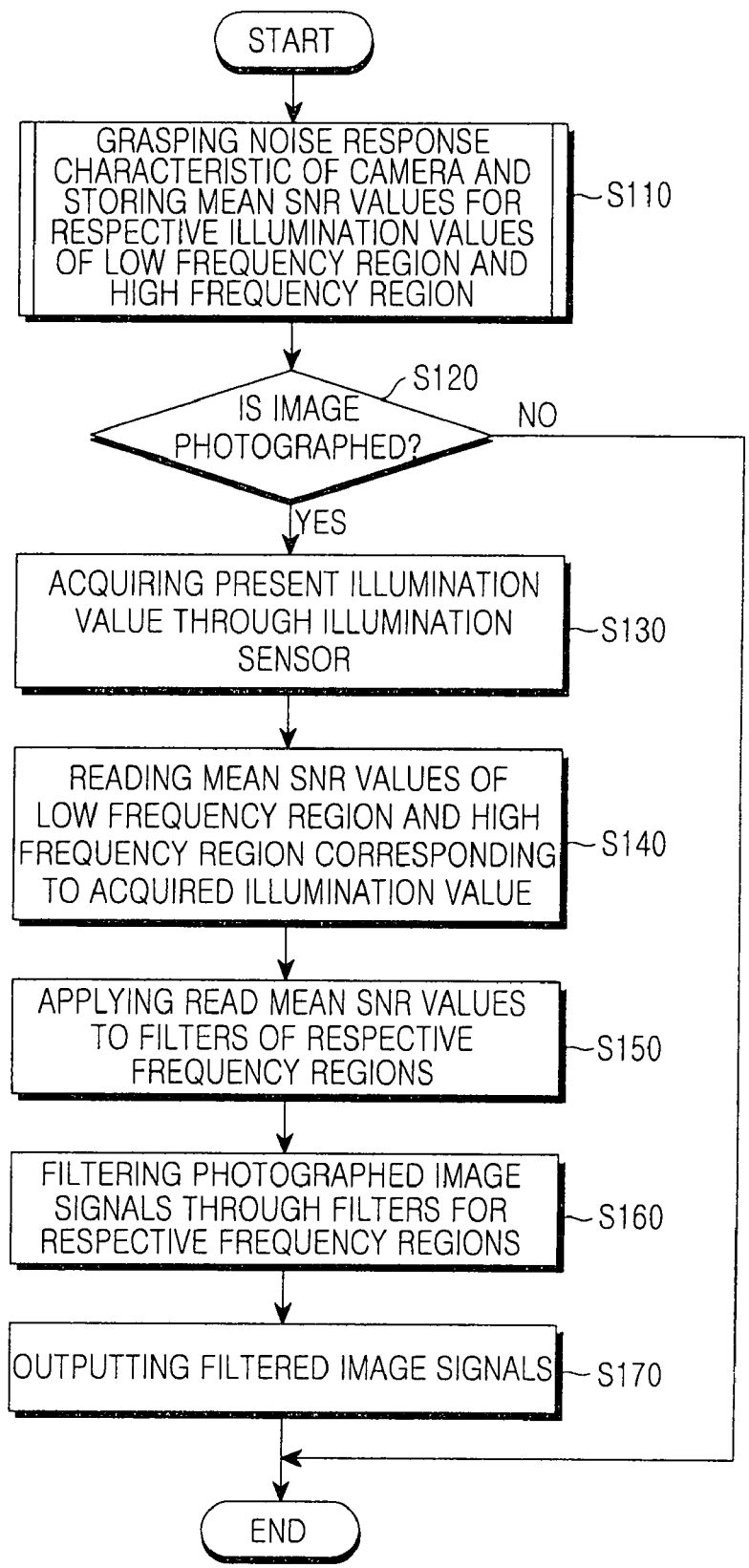
FIG. 2 is a flowchart illustrating steps of operating a camera apparatus according to an embodiment of the present invention.
Figure 3:
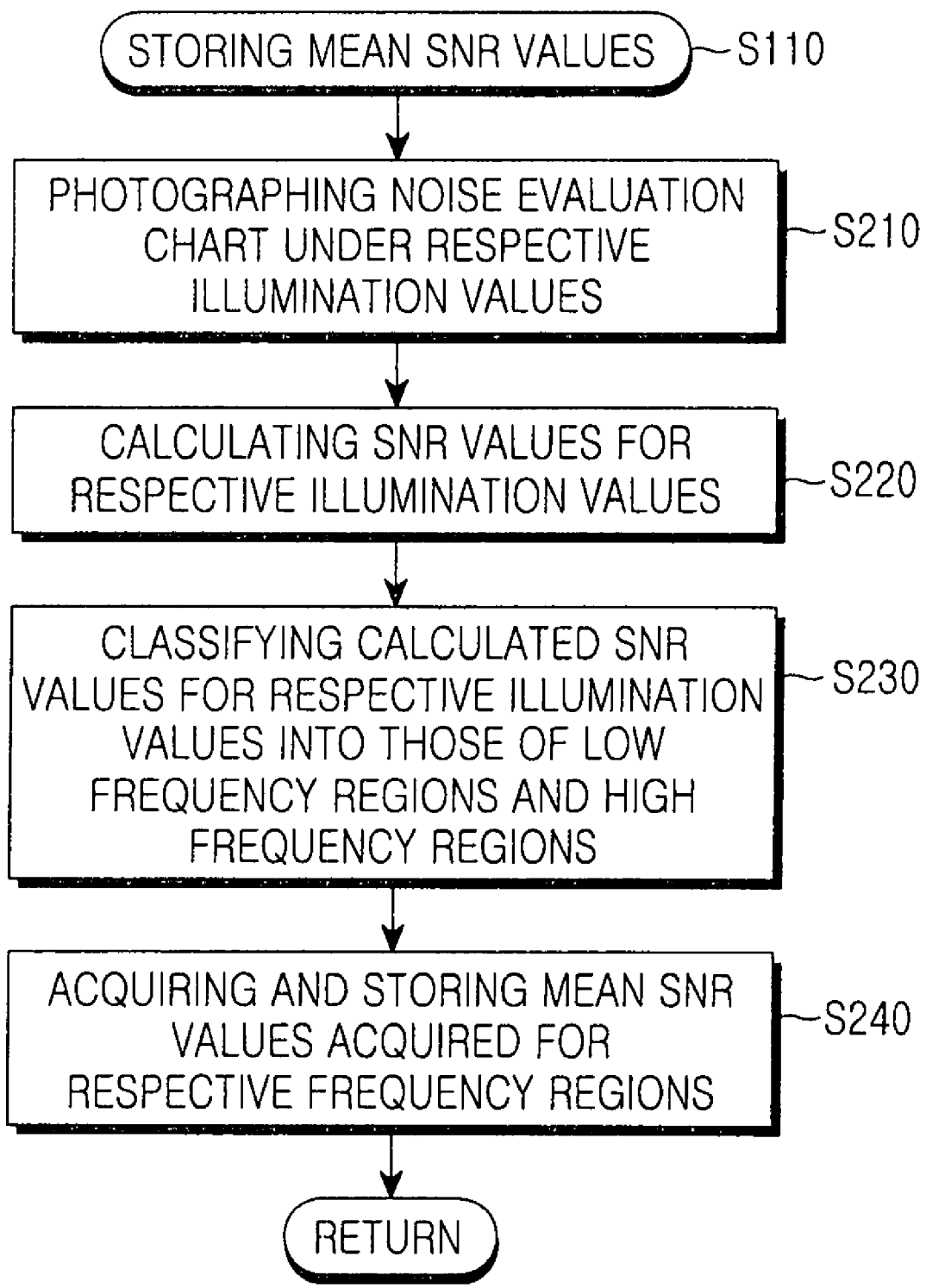
FIG. 3 is a flowchart illustrating in more detail the process of storing mean signal-to-noise ratio values of a low frequency region and a high frequency region according to respective illumination values.

FIG. 2 is a flowchart illustrating steps of operating a camera apparatus according to an embodiment of the present invention, and FIG. 3 is a flowchart illustrating the step of storing mean signal-to-noise ratio values for respective illumination values in a low frequency region and a high frequency region.

Referring to FIGS. 1 to 3, the control unit 130 grasps the noise response characteristics of the camera unit 140 and stores the mean signal-to-noise ratio values for respective illumination values in the low frequency region and the high frequency region in the memory unit 120 (S110). The step S110 will be described below in more detail with reference to FIG. 3 hereinafter.

Referring to FIG. 3, the control unit 130 controls the camera unit 140 at a place provided with a standard or normal light source and having an illumination value of not more than 1 lux, to photograph a noise evaluation chart (for example, a noise evaluation chart proposed by the camera test standard ISO 15739) under respective illumination values (S210). The normal light source typically has solar light (D65), fluorescent(F), incandescent(A), etc. The method of measuring the noise evaluation chart is defined by the standard ISO 15739. In summary, this method is to place the noise evaluation chart ISO 15739, which is photographed by the camera in the darkroom of no more than 1 lux, to illuminate the normal light source to the noise evaluation chart, and then to photograph the noise evaluation chart by the camera. Note that it is well known in the art. That is, the control unit 130 photographs the noise evaluation chart under respective illumination values (for example, 1 lux, 2 lux, 3 lux, ..., N lux).

The control unit 130 calculates signal-to-noise ratio values for image signals obtained from the images photographed under the respective illumination values (S220). At this time, the control unit 130 preferably calculates the signal-to-noise ratio values using the noise calculation equation proposed by ISO 15739. Because the noise calculation equation is well-known in the art, a detailed description thereof is omitted to avoid redundancy.

The control unit 130 classifies the calculated signal-to-noise ratio values for the respective illumination values into those included in the low frequency region and the high frequency region (S230). That is, the control units 130 classifies the calculated signal-to-noise ratio values into the signal-to-noise ratio values in the low frequency region and the signal-to-noise ratio values in the high frequency region.

Thereafter, the control unit 130 acquires the mean values of the signal-to-noise ratio values classified for the respective frequency regions and stores the acquired mean values in the memory unit 120 (S240).

Through the process shown in FIG. 3, the control unit 130 analyzes the noise characteristics of the low frequency and high frequency regions for respective illumination values, and employs the analyzed data as data for removing image noise according to illumination environments.

Referring back to FIG. 2, the control unit 130 stores the mean signal-to-noise ratio values for the respective illumination values, then checks whether there is a user's demand of photographing an image (for example, input of the shutter key) or not (S120).

The step S110 comprises analyzing the noise characteristics in the low frequency region and the high frequency region for the illumination value, and using the above-analyzed data as the data for removing image noise according to the illumination environment. The step S110 is only once performed at first. Thereafter, the step S110 reads, from the memory unit (120), the mean signal-to-noise values of the low frequency and high frequency regions corresponding to the acquired illumination value via the illumination sensor, and then changes the coefficient of a corresponding filter (160) after applying the mean signal-to-noise ratio values of the low frequency and high frequency regions read from the memory unit 120 to the high frequency filter and the low frequency filter of the filter unit 160, respectively. Therefore, the photographed image signal is filtered and output through the filter (160) in which the filter coefficients has been changed. When there is a user's demand of photographing an image, the control unit 130 photographs an image, and at the same time, acquires the present illumination value through the illumination sensor (S130).

The control unit 130 reads, from the memory unit 120, the mean signal-to-noise values of the low frequency and high frequency regions corresponding to the acquired illumination value (S140).

The control unit 130 applies the mean signal-to-noise values read from the memory unit 120 to the filter unit 160 (S150). More specifically, the control unit 130 applies the mean signal-to-noise ratio values of the low frequency and high frequency regions read from the memory unit 120 to the high frequency filter and the low frequency filter of the filter unit 160, respectively, thereby changing the coefficient(s) of a corresponding filter(s).

The control unit 130 filters the photographed image signals through the filter unit 150, the filter coefficients of which have been changed, separately for the respective frequency regions (S160).

As described above, according to the present invention, it is possible to adaptively remove noise from an edge region as well as a flat region by reflecting noise response characteristics, thus producing a natural image in the entirety of an image. As a result, the quality of image can be improved due to the efficient removal of noise, and hence the compression efficiency for an image can be also improved during the compression.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of removing image noise of a camera having an illumination sensor, comprising steps of:
   grasping the noise response characteristics of the camera and storing mean signal-to-noise ratio values for respective illumination values in a low frequency region and a high frequency region;
   acquiring a present illumination value using the illumination sensor when photographing an image;
   retrieving mean signal-to-noise ratio values of the low frequency region and the high frequency region corresponding to the present illumination value from the stored mean signal-to-noise ratio values; and
   applying the retrieved mean signal-to-noise values to filters for respective frequency regions to change coefficients of the filters, thereby filtering the signals of the photographed image.

2. The method as claimed in claim 1, wherein the step of storing mean signal-to-noise ratio values comprises:
   photographing a noise evaluation chart under respective illumination values and calculating signal-to-noise ratio values for the photographed images;
   classifying the calculated signal-to-noise ratio values into those of the low frequency region and those of the high frequency regions; and
   acquiring and storing mean signal-to-noise ratio values for the respective frequency regions.

3. The method as claimed in claim 1, wherein the step of filtering the signals of the photographed image comprises:
   applying the read mean signal-to-noise ratio values to the filters having a low frequency filter and a high frequency filter; and
   filtering the image signals through the respective filters.

4. A camera apparatus with an illumination sensor comprising:
   a camera unit for photographing an image and outputting signals of the photographed image;
   a filter unit for filtering the image signals separately for a low frequency region and a high frequency region;
   a memory unit for storing mean signal-to-noise ratio values for, respective illumination values of the low frequency region and the high frequency region according to noise response characteristics of the camera unit; and
   a control unit coupled to the memory unit for retrieving the signal-to-noise ratio values of the low frequency region and the high frequency region corresponding to an illumination value acquired through the illumination sensor when photographing an image, and for applying the read signal-to-noise values to the filter unit.

5. The method as claimed in claim 1, further comprising filtering signals of the photographed image after applying the retrieved mean signal-to-noise to the filter.

6. The method as claimed in claim 1, wherein data in the memory unit is provided by:
- photographing a noise evaluation chart under respective illumination values and calculating signal-to-noise ratio values for the photographed images;
- classifying the calculated signal-to-noise ratio values into those of the low frequency region and those of the high frequency regions; and
- acquiring and storing mean signal-to-noise ratio values for the respective frequency regions.

7. The camera apparatus as claimed in claim 4, wherein the control unit performs control in such a manner that a noise evaluation chart is photographed under respective illumination values through the camera unit, thereby calculating signal-to-noise ratio values, the calculated signal-to-noise ratio values for the respective illumination values are classified into those of the low frequency region and those of the high frequency region, thereby acquiring the mean signal-to-noise ratio values for the respective frequency regions.

8. The camera apparatus as claimed in claim 4, wherein the filter unit comprises a high frequency filter and a low frequency filter.

9. The camera apparatus as claimed in claim 8, wherein the retrieved mean signal-to-noise ratio values of the low frequency region and the high frequency region are applied to the low frequency filter and the high frequency filter, respectively, thereby changing coefficients of the filters.

10. A method of removing image noise in a camera having an illumination sensor and a filter, comprising steps of:
- obtaining a present illumination value using the illumination sensor when photographing an image;
- retrieving mean signal-to-noise ratio values of a low frequency region and a high frequency region corresponding to the present illumination value from a memory unit; and
- applying the retrieved mean signal-to-noise values to the filter for respective frequency regions in order to change coefficients of the filter.

* * * * *